July 3, 1956  H. D. BRAILSFORD  2,753,501
TRANSISTOR COMMUTATED DIRECT CURRENT MOTOR
Filed Oct. 17, 1955
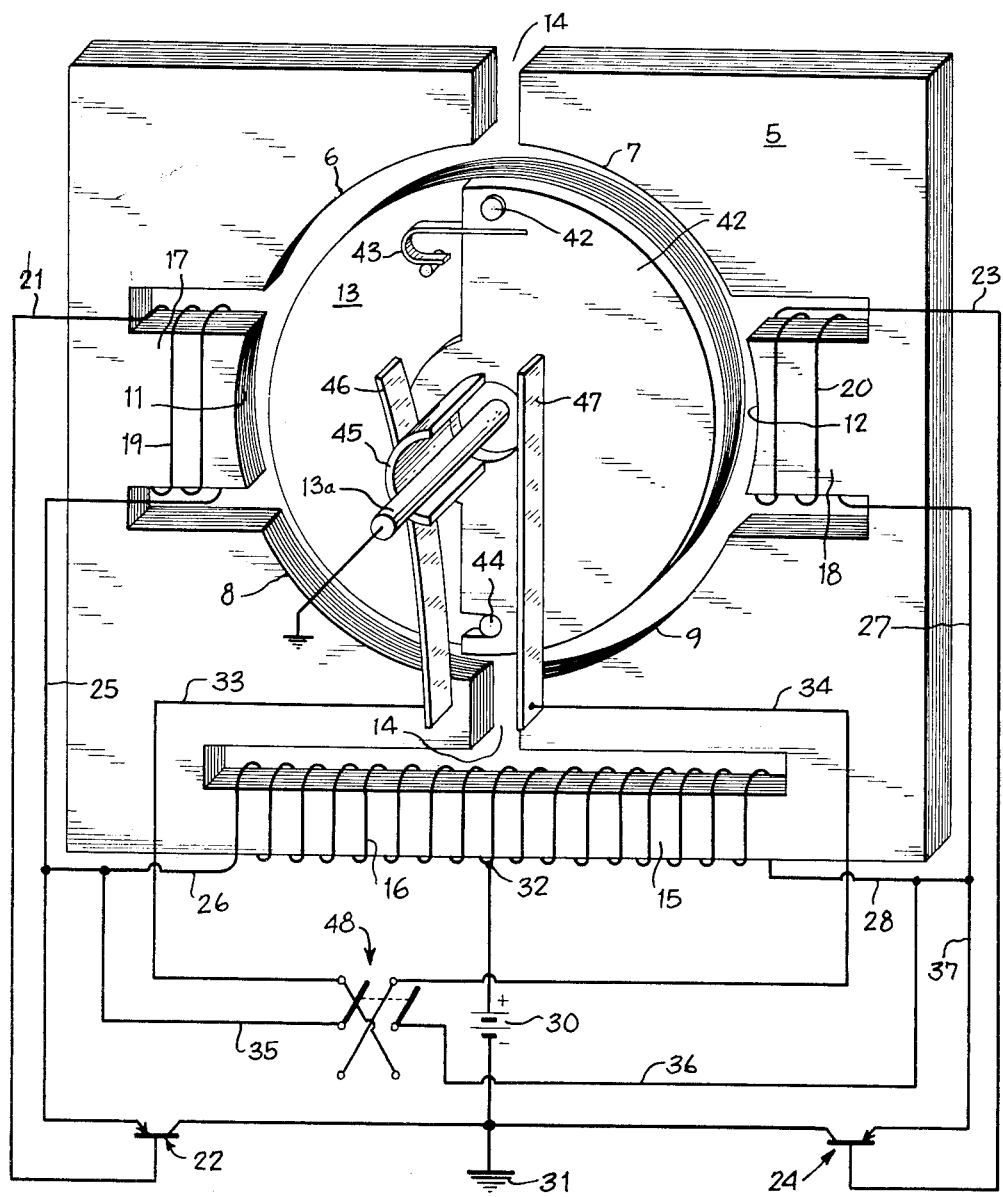
INVENTOR.
HARRISON D. BRAILSFORD
BY Darby + Darby
ATTORNEYS United States Patent Office 2,753,501
Patented July 3, 1956

2,753,501

TRANSISTOR COMMUTATED DIRECT CURRENT MOTOR

Harrison D. Brailsford, Rye, N. Y.

Application October 17, 1955, Serial No. 540,958

10 Claims. (Cl. 318—254)

The present invention relates to a commutatorless direct current motor. More particularly still the invention relates to a motor which utilizes transistors to eliminate the usual commutator.

Such a motor has been described in my application Serial No. 435,759, filed June 10, 1954, now Patent 2,719,944, dated October 4, 1955. This motor, although it has great advantages, is not self-starting and this is in some situations a drawback.

The present invention comprises an improvement over the transistor motor of the above-mentioned copending application in that it provides for self-starting and, in addition, provides a ready means for reversing the direction of rotation of the motor while retaining the self-starting feature. The motor of the prior application, as has been indicated, was not self-starting and was reversible only in the sense that it would rotate in either direction when initially started in that direction by manual rotation.

It is an object of the present invention, therefore, to provide a commutatorless direct current motor of the transistor type which has the additional advantage of being self-starting.

It is another object of the invention to provide such a self-starting commutatorless direct current motor which may be started in either direction and will continue its rotation in the selected direction.

Other objects and features of the invention will be apparent when the following description is considered in connection with the single figure of the drawing which is a perspective view of a motor in accordance with the present invention.

Referring now to the drawing, there is shown at 5 a soft iron pole peice having the main pole faces 6, 7, 8 and 9 and the auxiliary pole faces 11 and 12, all of these pole faces lying on the surface of a cylinder. Mounted for rotation concentrically of the pole faces is a rotor 13 which, as in the copending application above referred to, is magnetized across a diameter thereof, which diameter extends, when the rotor is at rest, across the air gaps 14 formed in the pole piece 5. The rotor 13 is mounted upon a shaft 13a which shaft is suitably supported in bearings, not shown.

Wound upon a core portion 15 of the pole piece 5 is a center tapped coil 16. Likewise formed on the pole piece 5 are the core portions 17 and 18, each of which has a winding thereon, that on the left hand core portion being designated 19 and that on the right hand core portion 20. The winding 19 is connected by means of a conductor 21 to the base of a transistor 22 and in a similar fashion winding 20 is connected by means of conductor 23 to the base of a transistor 24.

The other terminal of winding 19 is connected by means of a conductor 25 to the emitter of the transistor 22 and by means of conductor 26 to the left hand end of winding 16. In a like manner the second terminal of the winding 20 is connected by means of a conductor 27 to the emitter of transistor 24 and by means of conductors 27 and 28 to the right hand terminal of the winding 16. The collector terminals of transistors 22 and 24 are connected together and to the negative terminal of a battery indicated at 30 which negative terminal is grounded as shown at 31. The positive terminal of this battery is connected as shown at 32 to the center tap of the coil 16.

It will be seen that as thus far described the motor is substantially identical with that shown in Figure 2 of my copending application above referred to; it will be understood however that the improvements about to be described are equally applicable to the motor of Figure 1 of that application.

In the instant device there is provided on the rotor 13 a pivotally mounted weight member 40 which is pivoted eccentrically of the rotor as shown at 42 and is normally urged toward its rest position (shown in the drawings) by means of a leaf spring 43, the weight being stopped in the rest position by means of a stop 44. Mounted on the weight member 40 is a contact 45 in the form of a semi-cylindrical sleeve. This contact cooperates with two fixed contacts mounted in any suitable manner, not indicated, adjacent the rotor 13 on opposite sides of the shaft 13a, these contacts being designated 46 and 47.

Contact 46 is connected by means of conductor 33 to the upper left hand terminal of a reversing switch 48. In a similar manner contact 47 is connected by means of conductor 34 to the right hand upper terminal of the reversing switch 48. The left hand blade of reversing switch 48 is connected by means of conductors 35 and 26 to the left hand terminal of the coil 16. Since the shaft 13a is connected to ground as is the collector terminal of transistor 22, it will be seen that when the contact 45 is in the position shown a shunt will be placed around transistor 22.

In the same manner the right hand blade of switch 48 is connected via conductor 36 and conductor 28 to the right hand terminal of coil 38. Thus when the rotor is at rest in a position wherein contact is not made between the member 45 and the contact 46 and is made between the member 45 and the contact 47, transistor 24 is shunted and a circuit is completed upon closure of switch 48.

Since, as has been indicated, one or the other of the contacts 46 and 47 is always engaged by the member 45 when the device is at rest, operation of switch 48 to either of its closed positions will cause a current to flow through one or the other of the two halves of the center tapped winding 16.

If the blades of switch 48 are moved into contact with the upper terminals while the rotor is at rest in the position shown in the drawing, then a circuit will be completed from ground through the rotor shaft, contact member 45, contact 46, conductor 33, upper left hand terminal and left hand blade of switch 48, conductor 35, conductor 26, left hand half of winding 16, and battery 30, back to ground at 31.

If the rotor has stopped in a position such that contact member 45 makes contact with the contact 47, and the blades of switch 48 are moved into contact with the upper terminals, then a similar circuit will be completed from ground through shaft 13a, contact member 45, contact 47, conductor 34, upper right hand terminal and right hand blade of switch 48, conductors 36 and 28, right hand half of winding 16, and battery 30 back to ground.

Thus, depending upon the position of the rotor, movement of the switch blades into contact with the upper terminals thereof will energize one or the other half of the winding 16. If the switch blades are moved into contact with the lower terminals then the conditions will be reversed and when member 45 is in contact with contact 46 the right hand half of winding 16 will be energized while, when it is in contact with contact 47, the left hand half of this winding will be energized.

Thus by closing the switch 48 against selected ones of its contacts the rotor may be caused to initially rotate in a desired direction. As the rotor comes up to speed centrifugal force causes the weight to pivot about the pivot point 42 moving the contact member 45 inwardly toward the shaft 13a and preventing engagement thereof with the contacts 46 and 47. Therefore, as the motor reaches its operating speed the flow of current alternating through the two halves of windings 16 due to the alternate closure of contact member 45 against contacts 46 and 47 ceases and at this time the transistors 22 and 24 take control of the operation. These transistors operate in the same manner as was described in my copending application above referred to. In brief, and assuming that the initial rotation resulting from closure of the switch 48 was in a clockwise direction, a current will be induced in the coil 20 and will flow in such a direction as to place a negative bias on the base of the transistor 24 rendering that transistor conductive.

As a result current flows from the negative pole of the battery 30 through the transistor and through conductors 37 and 28 and the right hand winding of coil 30 back to the battery. An electromagnetic field is thus set up in the field structure 5 making pole portions 7 and 8 north poles and the pole portions 6 and 9 south poles. The action of the south poles of the rotor on the coil 19 has no effect because the induced current from the coil in that position simply makes the base of transistor 22 positive maintaining it non-conductive. As the rotor pole reaches magnetic alignment with poles 11 and 12 the induced currents decay and, as the rotor poles pass this point, the polarities of these induced currents are reversed so that transistor 24 becomes non-conducting and transistor 22 becomes conducting. Thus the left hand portion of winding 16 is energized reversing the polarity of the running poles 11 and providing a second power impulse.

As has been indicated, the magnetic structure and air gaps are so proportioned that with no field provided from the coil 16, the rotor will seek the position shown in the drawing, that is, with its magnetic axis in alignment with the pole gaps 14. When the rotor is in this position and switch 48 is open, no current can flow since there is no bias on the base of either of the transistors 22 or 24. Therefore the motor remains at rest until the switch 48 is closed and then rotates in a direction dependent upon the direction of closure of the switch 48 and also upon whether the rest position is that shown in the drawing or 180° displaced therefrom.

While a preferred embodiment of the invention has been described, it will be obvious that modifications may be made to render the commutatorless direct current motor of my copending application self-starting and reversible, I wish therefore to be limited not by the foregoing disclosure, but solely by the claims granted to me.

What is claimed is:

1. In a commutatorless direct current motor of the type having a rotor, driving windings and control windings and transistors for energizing the driving windings under control of the control windings; in combination, a centrifugally operated weight mounted on the rotor, contacts closed by said weight when said rotor is at rest, said contacts being in shunt with the collector-emitter terminals of the transistors and a switch in said shunt circuit whereby closure of said switch when said rotor is at rest energizes the driving windings and starts said rotor in motion, the said centrifugally operated weight then moving under centrifugal force to open said shunt, said motor being then under control of the control windings and the transistors.

2. In a commutatorless direct current motor of the type having a rotor, driving windings in series with a battery connected across the transistor collector and emitter terminals and control windings connected across the transmitter base and emitter terminals; in combination, contacts connected across the transistor collector and emitter terminals, and centrifugally operated means operated by said rotor for closing said contacts at low speed to thereby produce impulses to bring said rotor to normal speed, said centrifugally operated means then operating to open said contacts and cause the motor to run under control of said control windings and transistors.

3. A direct current electric motor comprising, in combination, a stationary electromagnetic field structure, a permanently magnetized bar mounted for rotation within said field structure, at least one driving winding on a core portion of said field structure, at least one control winding on a core portion of said field structure, a circuit including a source of direct current, at least one transistor connected with its emitter-collector terminals in series with said driving winding, and its base and emitter terminals connected in series with said control winding, said transistor being rendered conductive by the current induced in said control winding in response to rotation of said bar to supply current from said source to said driving winding to thus produce magnetic pulses in said field structure for rotating said bar, a contact connected in shunt to said transistor collector-emitter circuit, and centrifugal means driven by said rotor for closing said shunt circuit when said rotor is at rest to thereby energize said driving windings and start said rotor from its rest position, said centrifugal means operating to open said shunt when said rotor attains its normal speed.

4. A direct current electric motor as claimed in claim 3, characterized in that said centrifugal means comprises a weight pivotally mounted on said rotor and said contact is mounted adjacent said rotor in position to be engaged by said weight when said rotor is at rest.

5. A device as claimed in claim 3, characterized in that a manually operable switch is placed in said shunt circuit around said transistor whereby upon closure of said switch while said rotor is at rest, said driving winding is energized to start said motor.

6. A devce as claimed in claim 5, wherein said switch is a reversing switch whereby closure of the switch in a selected direction determines the direction of rotation of said rotor.

7. A direct current electric motor comprising, in combination, a stationary electromagnetic field structure, a permanently magnetized bar mounted for rotation within said field structure, a pair of driving windings comprising two oppositely poled windings on core portions of said field structure, a pair of control windings comprising two oppositely poled windings on core portions of said field structure, a pair of transistors, the bases of said transistors being connected to said control windings individually to render said transistors conductive by flux generated in said windings, the collector terminals of said transistors being individually connected to said driving windings and to a battery to produce flow of current therethrough when said corresponding transistors are rendered conductive, contact means connected in shunt to the collector terminals of said transistors individually, and centrifugally operated means associated with said rotor for closing one of said contact means when said rotor is at rest whereby said motor may be started by connecting said battery to one of said driving windings through said one contact means shunted about said transistor, said contact means then closing alternately to produce alternate pulses in said driving windings, said shunt circuits being removed when the motor achieves normal speed, said shunt circuits then remaining open and said motor operating through impulses induced in said control windings to render said transistors conductive.

8. A motor as claimed in claim 7, wherein said centrifugally operated means comprises a weight pivotally mounted eccentrically on said rotor and said contacts comprise members mounted in a stationary position adjacent said weight and a member carried by said weight and adapted to make contact with said stationarily mounted contact members alternately when said rotor is at rest, said weight carrying member moving away from said contact members as the motor speed increases.

9. A device as claimed in claim 7, wherein a manually operated switch is in series with said contact members whereby closure of said switch when said rotor is at rest energizes one of said driving windings, said driving windings then being alternately energized under control of said contact members until the speed thereof approaches normal, said centrifugally operated weight then moving in a direction to maintain said contacts out of engagement and permit continued operation of said motor under control of currents induced is said transistors by said control windings.

10. A device as claimed in claim 9, wherein said manually operated switch is a reversing switch connected to energize a selected one of said driving windings when a particular contact member is closed due to the motor rotor being in a rest position.

No references cited.